United States Patent
Usui et al.

(10) Patent No.: US 6,610,225 B2
(45) Date of Patent: Aug. 26, 2003

(54) METHOD FOR CONTROLLING MOTOR-DRIVEN INJECTION MOLDING MACHINE

(75) Inventors: Kazuo Usui, Nagano (JP); Shuichi Arai, Nagano (JP); Syuichi Hokino, Nagano (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 235 days.

(21) Appl. No.: 09/794,105

(22) Filed: Feb. 28, 2001

(65) Prior Publication Data

US 2001/0019184 A1 Sep. 6, 2001

(30) Foreign Application Priority Data

Mar. 1, 2000 (JP) ........................................ 2000-056250

(51) Int. Cl.[7] .............................................. B29C 45/76
(52) U.S. Cl. .................... 264/40.1; 264/40.1; 264/328.1
(58) Field of Search ............................. 264/40.1, 328.1

(56) References Cited

U.S. PATENT DOCUMENTS

| | | | | |
|---|---|---|---|---|
| 4,837,490 A | * | 6/1989 | Neko | 318/568.1 |
| 4,847,023 A | * | 7/1989 | Neko | 264/40.1 |
| 5,680,025 A | * | 10/1997 | Bowers et al. | 318/806 |
| 5,792,395 A | * | 8/1998 | Ito et al. | 264/40.1 |

FOREIGN PATENT DOCUMENTS

| | | | |
|---|---|---|---|
| JP | 1-196322 | * | 8/1989 |
| JP | A11235743 | | 8/1999 |

* cited by examiner

*Primary Examiner*—Jill L. Heitbrink
(74) *Attorney, Agent, or Firm*—Birch, Stewart, Kolasch & Birch, LLP

(57) ABSTRACT

A method for controlling a motor-driven injection molding machine in which heat generation of a drive section including a drive motor is monitored, and when the drive section enters an overload state, the drive motor is stopped. In the method, during molding, heat generation value (overload factor) of the drive motor is estimated from load current flowing through the drive motor. When the estimated heat generation value (overload factor) reaches a preset stopping point or when a thermostat attached to the drive section outputs an overload detection signal indicating an overload state, the drive motor is stopped.

10 Claims, 4 Drawing Sheets

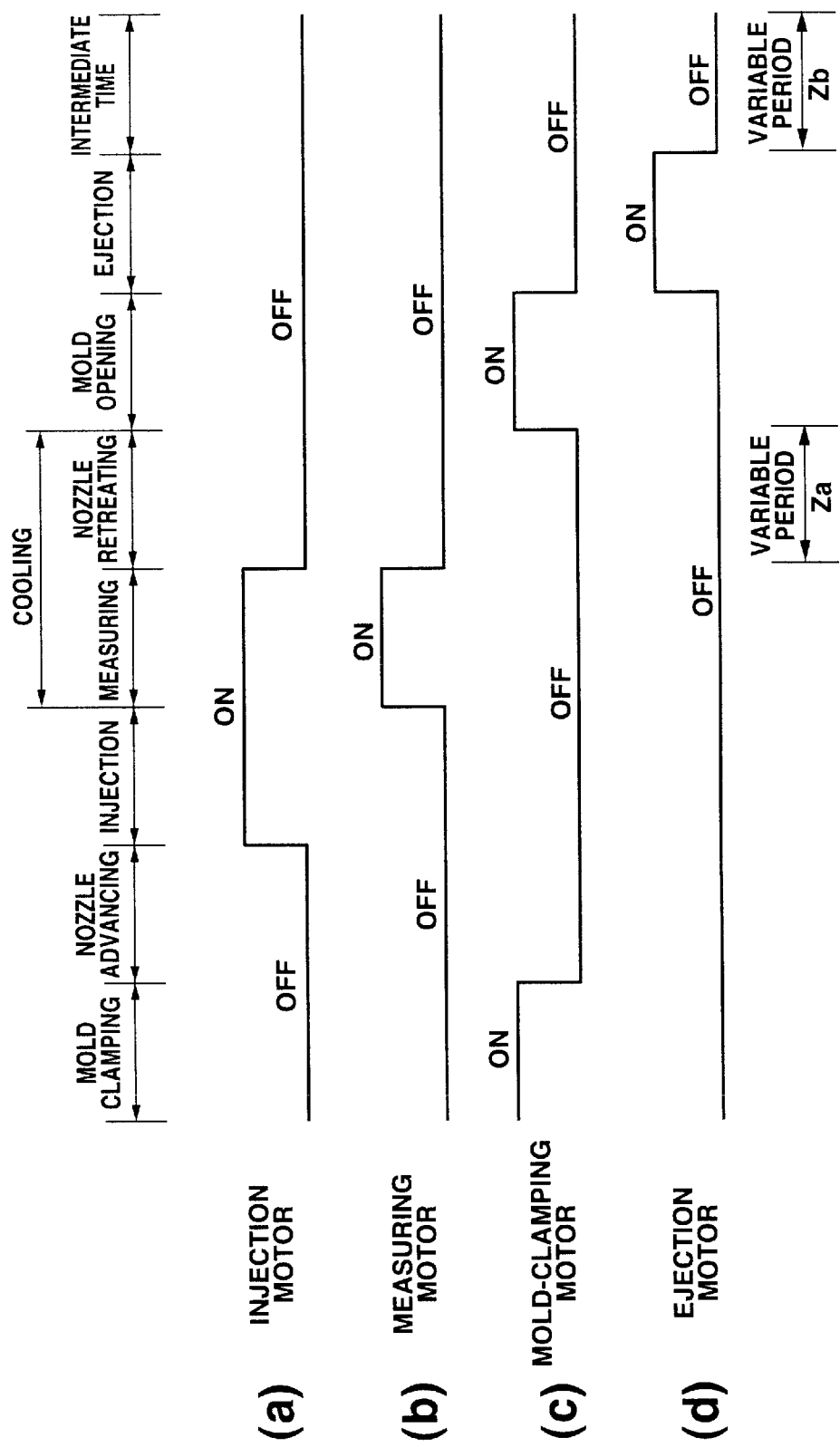

METHOD FOR CONTROLLING MOTOR-DRIVEN INJECTION MOLDING MACHINE

BACKGROUND OF THE INVENTION

1. Field of the Invention

The present invention relates to a motor-driven injection molding machine using a drive motor (servomotor) serving as a drive source.

2. Description of the Relevant Art

Generally, a motor-driven injection molding machine using a servomotor as a drive source potentially involves malfunction or breakage of the servomotor due to overheat arising under certain molding conditions or under a certain environment, since the servomotor generates heat according to load current. Therefore, the motor-driven injection molding machine usually employs measures for protection of the servomotor. Specifically, a heat generation value of the servomotor is detected. When the detected heat generation value reaches a preset stopping point, the value is interpreted as indicating overload, and the servomotor is forcibly stopped to thereby protect the servomotor.

For an injection molding machine, stoppage of a servomotor during molding means interruption of a molding process, which may have an adverse effect on the molding process once resumed. Therefore, interruption of a molding process must be avoided to the extent possible. In order to meet the end, Japanese Patent Application Laid-Open (kokai) No. 11(1999)-235743 proposes a method for checking preset operating conditions. According to the proposed method, the injection molding machine is operated on a trial basis, and heat generation value (estimated heat generation value) of a servomotor is calculated from load current flowing through the servomotor. On the basis of the result of the calculation, it is judged whether or not the servomotor operates in an overloaded unstable region. When the servomotor operates in the overloaded unstable region, the preset operating conditions are reviewed so as to impart appropriate allowance thereto, to thereby avoid interruption of operation (molding process) during actual molding.

The above-mentioned conventional method for detecting an overload state involves the following problems.

First, since heat generation value of a servomotor is detected indirectly from load current flowing through the servomotor, the detected heat generation value may differ from the actual heat generation value, which is affected by a change in ambient atmosphere (room temperature) and other factors, so that the conventional method is neither reliable nor stable.

Second, since the preset operating conditions are reviewed at the stage of trial operation performed before regular molding operation so as to impart appropriate allowance thereto, the injection molding machine may fail to operate under optimum operating conditions, and cannot flexibly cope with the actual molding state, resulting in impaired molding quality or productivity.

SUMMARY OF THE INVENTION

An object of the present invention is to provide a method for controlling a motor-driven injection molding machine capable of realizing a dual protection function through direct monitoring and indirect monitoring, thereby enhancing reliability and stability in protecting drive motors.

Another object of the present invention is to provide a method for controlling a motor-driven injection molding machine capable of flexibly coping with the actual molding state and of always conducting molding under optimum molding conditions to thereby avoid impairment in molding quality and productivity.

To achieve the above objects, the present invention provides a method for controlling a motor-driven injection molding machine in which heat generation of a drive section including a drive motor is monitored, and when the drive section enters an overload state, the drive motor is stopped. In the method, during molding, heat generation value (overload factor) of the drive motor is estimated from load current flowing through the drive motor. When the estimated heat generation value (overload factor) reaches a preset stopping point or when a thermostat attached to the drive section outputs a signal indicating an overload state, the drive motor is stopped.

BRIEF DESCRIPTION OF THE DRAWINGS

FIG. 4 is a timing chart showing operation of drive motors provided in drive sections of the motor-driven injection molding machine.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known features is omitted.

The configuration of a motor-driven injection molding machine 1 capable of carrying out a control method according to the present embodiment will be described with reference to FIG. 3.

Figure 3:
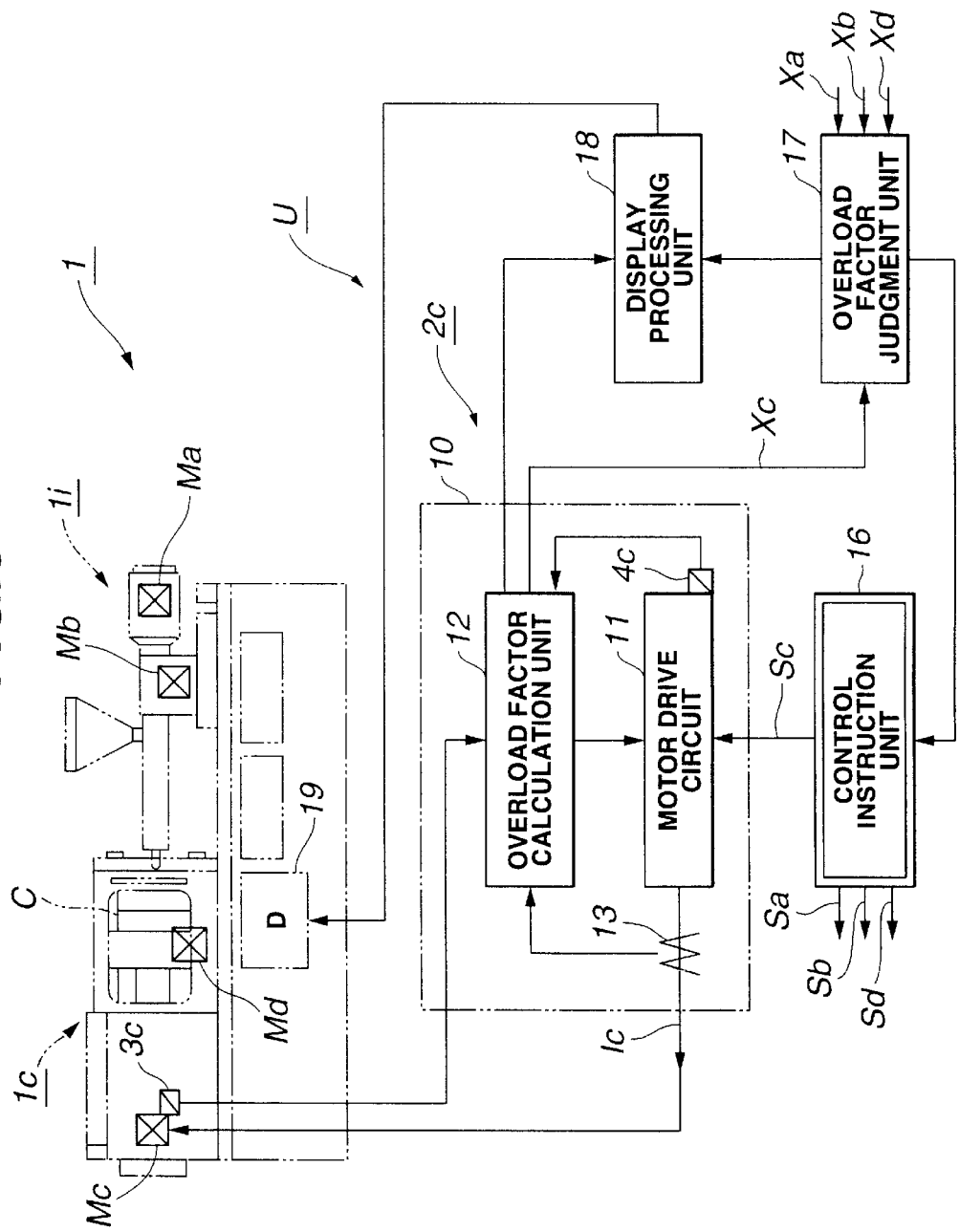
FIG. 3 is a block diagram of the control system of a motor-driven injection molding machine capable of carrying out the control method.

FIG. 3 shows a control system for controlling a mold-clamping motor (drive motor) Mc, which serves as a drive source of a mold-clamping mechanism installed in a mold-clamping unit 1c for clamping a mold C. Reference numeral 10 denotes a servoamplifier. The servoamplifier 10 includes a motor drive circuit 11 for driving the mold-clamping motor Mc, which is a servomotor, and an overload factor calculation unit 12 for calculating overload factor Xc (%) (estimated heat generation value) from load current Ic flowing through the mold-clamping motor Mc. In order to detect the magnitude of the load current Ic flowing through the mold-clamping motor Mc, a current sensor 13 is disposed in a connection line connecting the motor drive circuit 11 and the mold-clamping motor Mc. The load current Ic detected by the current sensor 13 is supplied to the overload factor calculation unit 12. The mold-clamping motor Mc and the servoamplifier 10 constitute a drive section 2c.

A first thermostat 3c is attached to the mold-clamping motor Mc in order to directly detect the temperature of the mold-clamping motor Mc. Upon detection of a preset temperature (overload state), the first thermostat 3c outputs an overload detection signal. A second thermostat 4c is attached to the motor drive circuit 11 in order to directly detect the temperature of the motor drive circuit 11. Upon detection of a preset temperature (overload state), the second thermostat 4c outputs an overload detection signal. The first thermostat 3c and the second thermostat 4c are connected to the overload factor calculation unit 12.

Reference character U denotes a controller having computer-processing functions. The controller U includes a control instruction unit 16 and an overload factor judgment unit 17, which both operate under computer-processing functions, as well as a display processing unit 18. The overload factor calculation unit 12 supplies the overload factor Xc to the overload factor judgment unit 17. The overload factor judgment unit 17 supplies the result of judgment to the control instruction unit 16 and the display processing unit 18. The control instruction unit 16 supplies the motor drive circuit 11 with a control signal Sc for controlling the mold-clamping motor Mc. The overload factor calculation unit 12 is connected to the display processing unit 18 and the motor drive circuit 11. An output terminal of the display processing unit 18 is connected to a display 19.

In addition to the mold-clamping motor Mc provided in the drive section 2c, the motor-driven injection molding machine 1 further includes other drive motors provided in the remaining drive sections; specifically, as shown in FIG. 3, an injection motor (servomotor) Ma for moving forward and backward a screw of an injection unit 1i; a measuring motor (servomotor) Mb for rotating the screw of the injection unit 1i; and an ejection motor (servomotor) Md for ejecting a molded article from the mold C of the mold-clamping unit 1c. As in the case of the mold-clamping motor Mc, the motors Ma, Mb, and Md are connected to respective servoamplifiers 10 similar to the servoamplifier 10 for the mold-clamping motor Mc. Overload factor calculation units 12 of the respective servoamplifiers 10 supply the overload factor judgment unit 17 with an overload factor Xa of the injection motor Ma, an overload factor Xb of the measuring motor Mb, and an overload factor Xd of the ejection motor Md. The control instruction unit 16 supplies motor drive circuits 11 of the respective servoamplifiers 10 with a control signal Sa for controlling the injection motor Ma, a control signal Sb for controlling the measuring motor Mb, and a control signal Sd for controlling the ejection motor Md. Also, the motors Ma, Mb, and Md are equipped with respective first thermostats 3c similar to the first thermostat 3c for the mold-clamping motor Mc, and the motor drive circuits 11 are equipped with respective second thermostats 4c similar to the second thermostat 4c for the mold-clamping motor Mc. The first thermostats 3c and the second thermostats 4c are connected to the corresponding overload factor calculation units 12.

A method for controlling the motor-driven injection molding machine 1 according to the present embodiment will next be described with reference to FIGS. 1 to 4.

FIG. 4 is a timing chart showing operation of the injection motor Ma, the measuring motor Mb, the mold-clamping motor Mc, and the ejection motor Md. In FIG. 4, an OFF does not necessarily mean interruption of electric supply to the motor Ma, Mb, Mc, or Md, but may mean no-load operation of the same.

Description below assumes that a normal molding process is performed. As shown in section (c) of FIG. 4, the mold-clamping motor Mc is operated (as represented by an ON) in a mold-clamping stage (including a mold-closing stage) and in a mold-opening stage, while the load current Ic flows to the mold-clamping motor Mc; and the mold-clamping motor Mc is stopped (as represented by an OFF) in other stages. In a time span ON in which the mold-clamping motor Mc is operated, the overload factor Xc is obtained on the basis of the load current Ic flowing through the mold-clamping motor Mc.

Figure 1:
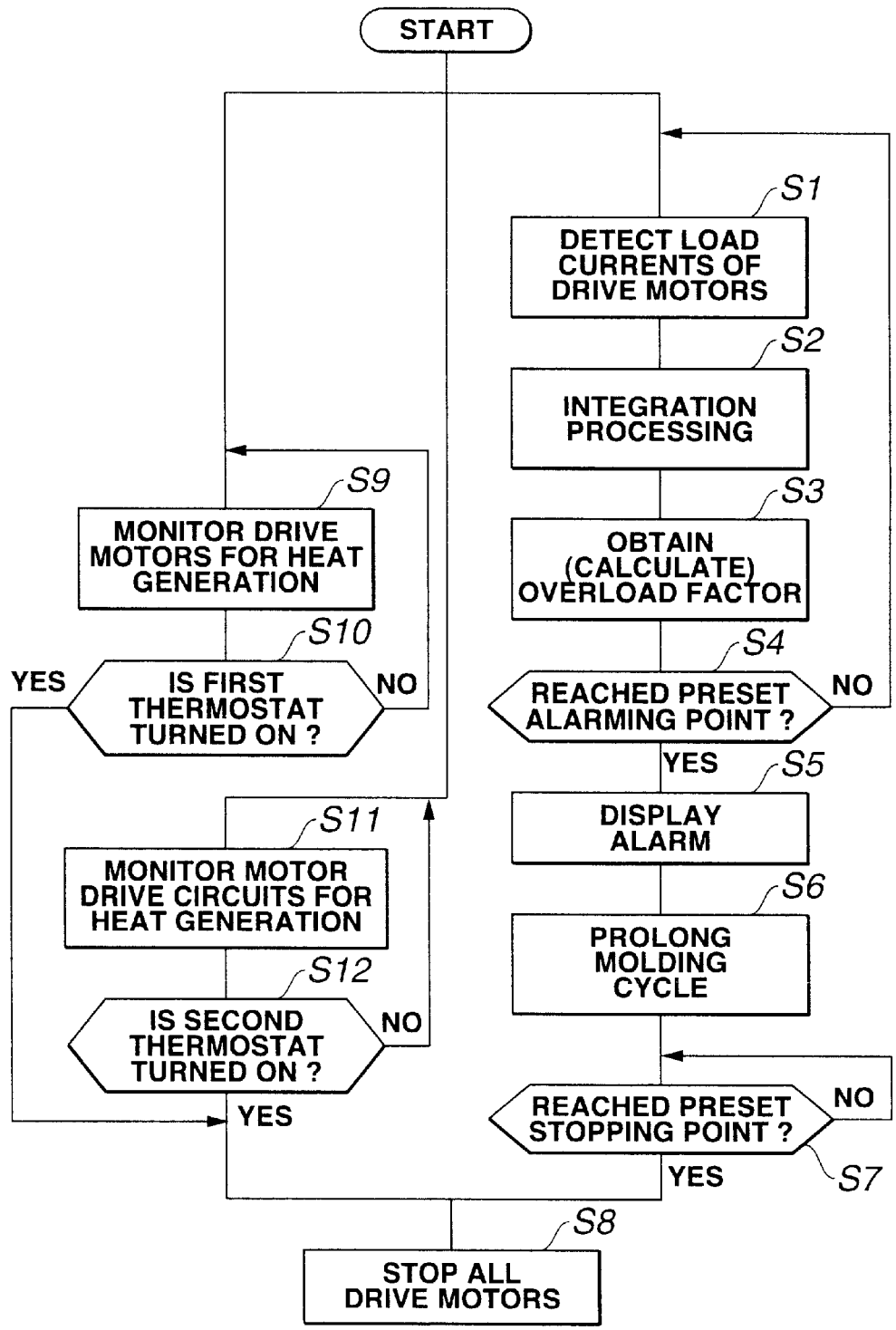
FIG. 1 is a flowchart showing the steps of a control method according to an embodiment of the present invention.

The overload factor Xc is obtained as illustrated in FIG. 1. First, the load current Ic is detected by means of the current sensor 13 (step S1). The overload factor calculation unit 12 is informed of the detected load current Ic and estimates a heat generation value of the mold-clamping motor Mc on the basis of the detected load current Ic. Specifically, the load current Ic is integrated with respect to time to thereby estimate the heat generation value (step S2). The ratio of the estimated heat generation value to a preset stopping point (preset heat generation value) for stopping the mold-clamping motor Mc is obtained for use as the overload factor Xc (step S3).

Figure 2:
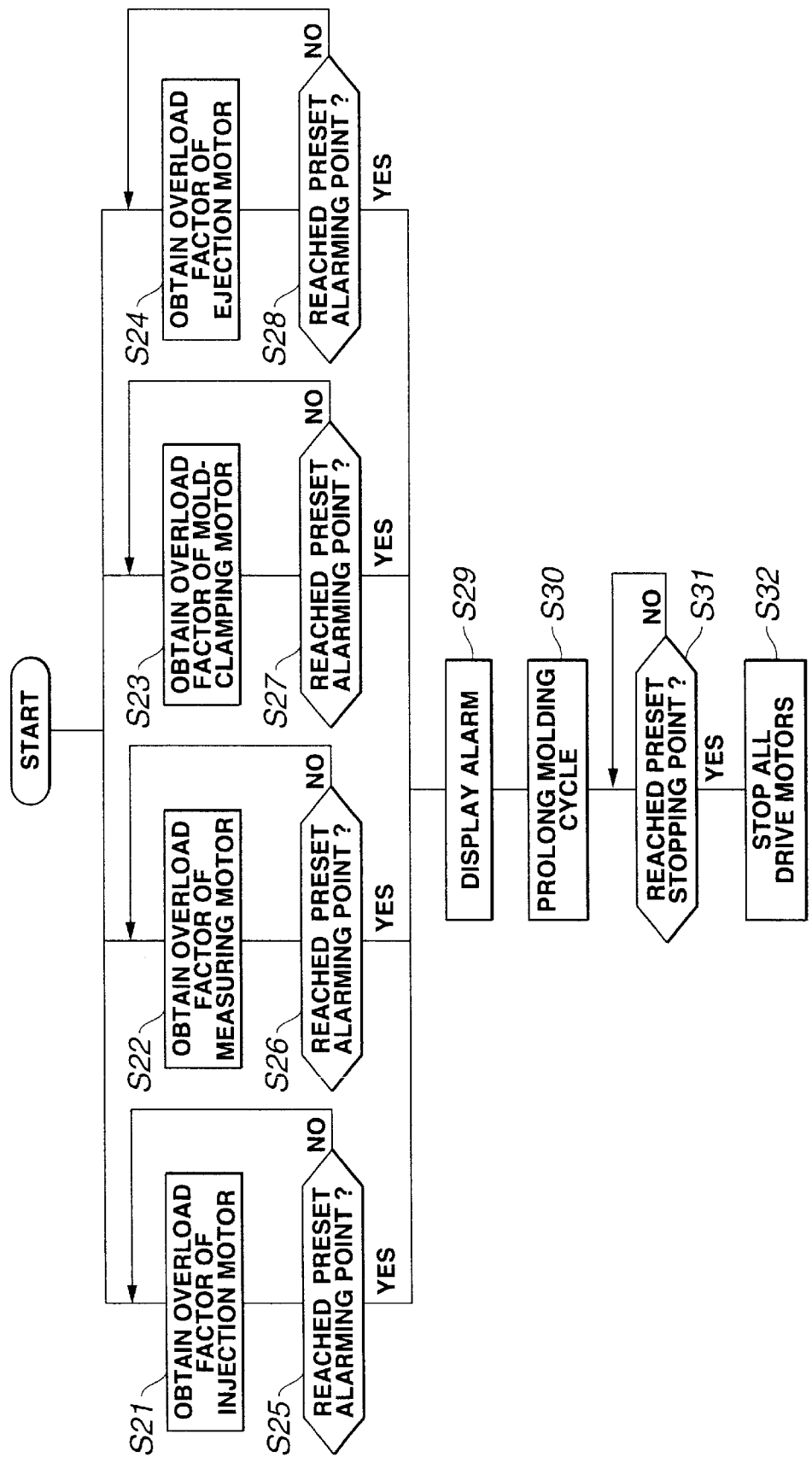
FIG. 2 is a flowchart showing the details of a portion of the control method.

Similarly, as shown in section (a) of FIG. 4, the injection motor Ma is operated (ON) in an injection stage and in a measuring stage, and is stopped (OFF) in other stages. As shown in section (b) of FIG. 4, the measuring motor Mb is operated (ON) in the measuring stage, and is stopped (OFF) in other stages. As shown in section (d) of FIG. 4, the ejection motor Md is operated (ON) in an ejection stage, and is stopped (OFF) in other stages. As shown in FIG. 2, as in the case of the mold-clamping motor Mc described above, the overload factor Xa of the injection motor Ma, the overload factor Xb of the measuring motor Mb, and the overload factor Xd of the ejection motor Md are obtained (steps S21, S22, S23, and S24).

The obtained overload factors Xa, Xb, Xc, and Xd are supplied to the overload factor judgment unit 17. The overload factor judgment unit 17 contains a preset stopping point Xs (100%) for stopping the motor Ma, Mb, Mc, or Md when the motor is overloaded, and a preset alarming point Xf (for example, 80%), which is lower than the stopping point Xs. The alarming point Xf does not need to be determined so as to stop the motor Ma, Mb, Mc, or Md, but is set to such a value that if the motor continues operating at the load factor, transit to the stopping point Xs is highly likely. The stopping point Xs and the alarming point Xf can be experimentally determined for the individual motors Ma, Mb, Mc, and Md.

The overload factor judgment unit 17 monitors the received overload factors Xa, Xb, Xc, and Xd (steps S4, S25, S26, S27, and S28). When any one of the overload factors Xa, Xb, Xc, and Xd reaches the alarming point Xf, the overload factor judgment unit 17 issues an alarm signal to the display processing unit 18. The display processing unit 18 causes the display 19 to display an alarm message (steps S5 and S29). The alarm signal is also issued to the control instruction unit 16. The control instruction unit 16 performs cycle prolong processing for prolonging the molding cycle accordingly (steps S6 and S30). Specifically, when the prolong processing is performed, as shown in FIG. 4, either period Za or Zb or both periods Za and Zb in the molding cycle are prolonged. During the periods Za and Zb, all of the motors Ma, Mb, Mc, and Md are stopped. The period Za is of a nozzle-retreating stage in which the injection unit 1i is caused to retreat. The period Zb is an intermediate time subsequent to an ejection stage. The molding cycle is prolonged according to an excess portion of the overload factor Xa, Xb, Xc, or Xd with respect to the alarming point Xf. Whether to prolong the molding cycle may be determined by an operator.

As a result of prolonging the molding cycle as above, the period of time during which the motors Ma, Mb, Mc, and Md are stopped is prolonged; i.e., cooling time is prolonged. After the molding cycle is thus prolonged, the overload factor judgment unit 17 continues monitoring the overload factors Xa, Xb, Xc, and Xd. When the relevant overload factor(s) drops below the alarming point Xf, the prolonged molding cycle may be returned to the previous molding cycle before prolongation. Alternatively, the prolonged molding cycle may be shortened according to the difference between the alarming point Xf and an estimated heat generation value, which is lower than Xf, but in such a manner as not to become shorter than the previous molding cycle before prolongation.

Thus, if an increase in the overload factor Xa, Xb, Xc, or Xd is transient, interruption of the molding process can be avoided. If the overload factor Xa, Xb, Xc, or Xd remains not less than the alarming point Xf after the elapse of a predetermined time, the processing for prolonging the molding cycle may be performed further if needed. By contrast, if the overload factor Xa, Xb, Xc, or Xd continues increasing even after performance of the cycle prolonging process and then reaches the stopping point Xs, a conceivable cause is not a mere transient increase in overload factor, but is some abnormality or trouble. Thus, at this point of time, the motors Ma, Mb, Mc, and Md are caused to stop (steps S7, S8, S31, and S32).

The first thermostats 3c and the second thermostats 4c directly monitor heat generated by the motors Ma, Mb, Mc, and Md and that from the motor drive circuits 11 (steps S9 and S11). Through combination of the direct monitoring of heat generation and the above-described indirect monitoring of heat generation on the basis of the overload factors Xa, Xb, Xc, and Xd obtained from the corresponding load currents Ic, dual protection is implemented. For example, indirect monitoring of heat generation on the basis of the overload factors Xa, Xb, Xc, and Xd may fail to detect an overload state when a great increase in motor temperature is caused by a change in ambient atmosphere (room temperature). Thus, when any one of the thermostats 3c and 4c outputs a signal indicative of overload, the molding cycle is forcibly stopped (steps S10, S12, and S8). In the present embodiment, setting is performed such that when the molding apparatus is used at an appropriate ambient temperature, an overload state is first detected through monitoring on the basis of the overload factors Xa, Xb, Xc, and Xd and is then detected by the thermostats 3c and 4c.

Further, when at least one of the obtained overload factors Xa, Xb, Xc, and Xd reaches the stopping point Xs, the drive motors Ma, Mb, Mc, and Md are controlled (or set) to stop after completion of a preset stage. In this case, the preset stage is preferably the final stage of the molding cycle. As described above, the indirect monitoring performed on the basis of the overload factors Xa, Xb, Xc, and Xd is given preference over the direct monitoring performed by use of the thermostats 3c and 4c, so that some margin remains even after the obtained overload factor Xa, Xb, Xc, or Xd has reached the stopping point Xs. Therefore, if the drive motors Ma, Mb, Mc, and Md are stopped after completion of the final stage of the molding cycle, it becomes possible to avoid an adverse effect on a molded article caused by interruption of the molding process and an adverse effect on a molding process after resumption of molding. By contrast, when one of the thermostats 3c and 4c outputs an overload detection signal, the drive motors Ma, Mb, Ma, and Md are controlled (or set) to stop immediately. This makes it possible to avoid adverse effects which would otherwise caused by continued operation of the drive motors Ma, Mb, Mc, and Md after occurrence of an overload state.

As described above, in the control method of the present embodiment, during molding, the overload factors Xa, Xb, Xc, and Xd (estimated heat generation value) of the drive motors Ma, Mb, Mc, and Md are obtained from load currents Ic flowing through the drive motors Ma, Mb, Mc, and Md; and the control for stopping the drive motors Ma, Mb, Mc, and Md is performed when one of the obtained overload factors Xa, Xb, Xc, and Xd reaches the preset stopping point Xs or when one of the thermostats 3c and 4c attached to the drive sections 2c outputs an overload detection signal indicating an overload state. Therefore, a dual protection function is realized through direct monitoring and indirect monitoring, so that the reliability and stability of the operation for protecting drive motors Ma, Mb, Mc, and Md are enhanced.

Moreover, the timing at which the overload factors Xa, Xb, Xc, or Xd reaches the stopping point Xs is set to come earlier than does the timing at which one of the thermostats 3c and 4c outputs an overload detection signal; when the overload factors Xa, Xb, Xc, or Xd reaches the alarming point Xf, which is lower than the stopping point Xs, the alarming processing and the cycle prolonging processing for prolonging the molding cycle are performed; and if the overload factor Xa, Xb, Xc, or Xd reaches the stopping point Xs after performance of the cycle prolonging processing, the drive motors Ma, Mb, Mc, and Md are caused to stop. Therefore, it is possible to reliably avoid interruption of molding which would otherwise result from a mere transient overload, resulting in enhanced reliability. In addition, since through flexible coping with the actual molding state, the molding can be performed under optimum molding conditions at all times, so that impairment in molding quality and productivity can be avoided.

While the present invention has been described with reference to the preferred embodiment, the present invention is not limited thereto. Regarding structural details, shape, technique, among others, modifications and any omission or addition may be possible as needed without departing from the scope of the invention. For example, the above embodiment is described while mentioning the injection motor Ma, the measuring motor Mb, the mold-clamping motor Mc, and the ejection motor Md as drive motors, but is not meant to exclude other drive motors. In the above embodiment, the overload factors Xa, Xb, Xc, and Xd are obtained for use in control; however, an estimated heat generation value may be used as is.

What is claimed is:

1. A method for controlling a motor-driven injection molding machine in which heat generation of a drive section including a plurality of drive motors is monitored and, when the drive section enters an overload state, at least one of the drive motors is stopped, the method comprising:

estimating, during molding, heat generation value of a drive motor from load current flowing through the drive motor; and stopping the drive motor when the estimated heat generation value reaches a preset stopping point or when a thermostat attached to the drive section outputs an overload detection signal indicating an overload state, wherein cycle prolonging processing for prolonging a molding cycle is performed when the estimated heat generation value reaches an alarming point, and the cycle prolonging processing is performed to prolong a portion of the molding cycle in which all of drive motors are stopped.

2. A method for controlling a motor-driven injection molding machine according to claim 1, wherein the heat generation value is estimated through integration of the load current with respect to time.

3. A method for controlling a motor-driven injection molding machine according to claim 1, wherein the drive section includes the drive motor and a servoamplifier for driving the drive motor, and a thermostat is attached to each of the drive motor and the servoamplifier.

4. A method for controlling a motor-driven injection molding machine according to claim 1, wherein control for stopping the drive motor after completion of a preset stage is performed when the estimated heat generation value reaches the stopping point, and control for stopping the drive motor immediately is performed when the thermostat outputs the overload detection signal.

5. A method for controlling a motor-driven injection molding machine according to claim 1, wherein a timing at which the estimated heat generation value reaches the stopping point is set to come earlier than does a timing at which the thermostat outputs the overload detection signal.

6. A method for controlling a motor-driven injection molding machine according to claim 1, wherein an alarm is issued when the estimated heat generation value reaches a preset alarming point, which is lower than the stopping point.

7. A method for controlling a motor-driven injection molding machine according to claim 1, wherein the cycle prolonging processing is performed to prolong the molding cycle according to an excess portion of the estimated heat generation value with respect to the alarming point.

8. A method for controlling a motor-driven injection molding machine according to claim 1, wherein whether to carry out the cycle prolonging processing is arbitrarily determined.

9. A method for controlling a motor-driven injection molding machine according to claim 1, wherein control for stopping the drive motors is performed when the estimated heat generation value reaches the stopping point after performance of the cycle prolonging processing.

10. A method for controlling a motor-driven injection molding machine according to claim 1, wherein the drive motors include at least one or more of an injection motor, a measuring motor, a mold-clamping motor, and an ejection motor.

* * * * *